United States Patent
Siweris

Patent Number: 5,872,537
Date of Patent: *Feb. 16, 1999

[54] MONOSTATIC HOMODYNE RADAR SYSTEM

[75] Inventor: Heinz-Juergen Siweris, Munich, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 822,569

[22] Filed: Mar. 19, 1997

[30] Foreign Application Priority Data

Mar. 19, 1996 [DE] Germany ............ 196 10 850.0

[51] Int. Cl.$^6$ .................................... G01S 13/26
[52] U.S. Cl. ........................... 342/128; 342/200
[58] Field of Search ................ 342/28, 89, 124, 342/128, 175, 200, 82

[56] References Cited

U.S. PATENT DOCUMENTS

| | | | |
|---|---|---|---|
| 3,772,584 | 11/1973 | Barley et al. ........................... | 327/113 |
| 4,069,482 | 1/1978 | Parker et al. ........................... | 342/162 |
| 4,492,960 | 1/1985 | Hislop ........................... | 342/175 |
| 4,541,120 | 9/1985 | Szabo ........................... | 455/86 |
| 5,109,545 | 4/1992 | Schiller et al. ........................... | 455/208 |
| 5,661,485 | 8/1997 | Manuel ........................... | 342/13 |

FOREIGN PATENT DOCUMENTS 0 472 229 A2  2/1992  European Pat. Off. .
1 448 266  2/1976  United Kingdom .

OTHER PUBLICATIONS

H.G. Unger, Hochfrequenztechnik In Funk Und Radar, (1972), 2 pages.

*Primary Examiner*—John B. Sotomayor
*Attorney, Agent, or Firm*—Hill & Simpson

[57] ABSTRACT

Monostatic homodyne radar system, in particular for continuous wave operation, in which one input port of a balanced mixer (2) is connected to an oscillator (1) and another input port of the mixer is connected to an antenna (3). The mixer has a directional coupler with a 90° phase difference between the coupling arms. The load impedances of the coupling arms have a reflection factor greater than 0.3, so that coupling of the power supplied from the oscillator to the antenna ensues, which coupling is sufficient for the radiation.

12 Claims, 2 Drawing Sheets

MONOSTATIC HOMODYNE RADAR SYSTEM

BACKGROUND OF THE INVENTION

With the increasing use of radar systems in the civil sector, e.g. in industrial measurement technology (e.g. level measurement), in traffic electronics (distance warnings, measurement of ground speed) and in the consumer area (motion sensors, door openers), a minimization of technological outlay and thereby of cost is particularly important. A radar system particularly suited for these applications uses a monostatic construction in which one antenna is used both for transmission and for reception. A radar system of this sort is called monostatic, in contrast to systems with separate transmitting and receiving antennas, called bistatic radar. In the standard design of a continuous-wave radar system in conventional radar technology, a radio-frequency signal produced by an oscillator is both radiated via the antenna as a transmission signal and is also used to convert the reception signal to a considerably lower frequency (the difference frequency of the two signals) in a mixer, according to the homodyne principle. For this purpose, a part of the power given off by the oscillator is branched off from the transmission signal using a directional coupler, and is supplied to the input of the mixer.

A system of this sort is schematically illustrated in FIG. 3. The oscillator 1 supplies the radio-frequency signal, from which a part is branched off in the directional coupler 11 and is supplied to the mixer 13. The separation of the transmission and reception signal at the antenna 3 ensues by means of a circulator 12. According to the application of the system, the frequency of the radio-frequency signal remains constant (e.g. in Doppler radar), or the frequency is altered by an external modulation signal (FMCW radar [frequency modulated continuous wave], pulse FM radar). The terminal 4 provided for the feeding of the external modulation signal and the terminal 5 provided for the tapping of the intermediate frequency are also shown in FIG. 3.

The circulator 12 used in this arrangement is a substantial obstacle to a simple and economical manufacturing of the radar system. A construction that does not use this circulator can be most simply realized by using two separate antennas for transmission and reception (bistatic radar). The main disadvantage here is the increase in the outer dimensions, caused essentially by the antennas. In addition, the directional characteristics do not agree precisely, especially at close range, due to the spatial displacement of the antennas. The circulator can also be omitted in a monostatic radar system if for example the arrangement shown in FIG. 4 is chosen. In this arrangement, the directional coupler 14 is also used to conduct the reception signal coming from the antenna to the radio-frequency input of the mixer 13. Corresponding to the coupling attenuation of the directional coupler 14, the power of the reception signal is not conducted completely to the mixer, in contrast to the arrangement with the circulator. The lower receiver sensitivity that thereby results can mainly be tolerated in the applications mentioned above, due to the short range (200 m maximum).

In the arrangements described, it was presupposed that the mixer is provided with separate inputs for the local oscillator signal and for the radio-frequency reception signal. This is the case in constructions with balanced mixers, preferred in microwave technology. In a non-balanced mixer (e.g. a one-diode mixer), the two radio-frequency signals to be mixed are supplied via a common terminal. With the use of such a mixer, a further simplification of the system according to FIG. 4 is possible by replacing the directional coupler with a T branching. The essential disadvantage of this variant is the negative influence on the sensitivity, due to the amplitude noise of the oscillator, said noise being demodulated in the non-balanced mixer. This solution thus appears to be suited only for sensors with ranges of a few meters.

SUMMARY OF THE INVENTION

It is an object of the present invention to provide a simplified radar system that has compact dimensions while requiring only a low number of components.

In general terms the present invention is a monostatic homodyne radar system. An oscillator produces a radio-frequency signal. A balanced mixer has two input ports and one output port. One input port of the mixer is connected to the oscillator and the other input port of the mixer is connected to an antenna. The mixer contains a directional coupler with a 90° phase difference between the coupling arms thereof. This directional coupler has two inputs that form the input ports of the mixer, and has two outputs. These outputs are terminated with impedances such that a reflection factor results that is at least large enough that coupling of the power emitted by the oscillator takes place between the input ports of the mixer, which coupling is sufficient for a provided transmission power.

Advantageous developments of the present invention are as follows.

The reflection factor is at least 0.3.

The mixer contains two transformation networks in which one input of each of these transformation networks is respectively connected to one output of the directional coupler, and one output of each of these transformation networks is respectively connected to a non-linear circuit element. These transformation networks bring about the provided reflection factor at the outputs of the directional coupler.

The mixer has non-linear circuit elements that are directly connected to the outputs of the directional coupler, and that are constructed and wired so that they bring about the provided reflection factor.

In one embodiment of the present invention the radio-frequency signal is modulated.

The inventive radar system is a monostatic homodyne radar system that can also be used e.g. for continuous wave operation. This radar system has an oscillator for the production of the radio-frequency signal and an antenna used for transmission and reception. This oscillator and the antenna are respectively connected to an input port of a mixer, which is also provided with an output port. The mixer is a balanced mixer comprising a directional coupler and two non-linear components. The phase difference between the two coupling arms of the directional coupler is 90°. The mixer is designed so that the coupling arms are terminated with load impedances, with a reflection factor that is greater than zero to such an extent that a sufficient portion of the power provided by the oscillator is coupled to the other input port of the mixer, and is available for radiation. The intermediate frequency produced by the mixing of the oscillator signal and a reception signal can be tapped at the output port of the mixer.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several FIGS. of which like reference numerals identify like elements, and in which:

DESCRIPTION OF THE PREFERRED EMBODIMENTS

Figure 1:
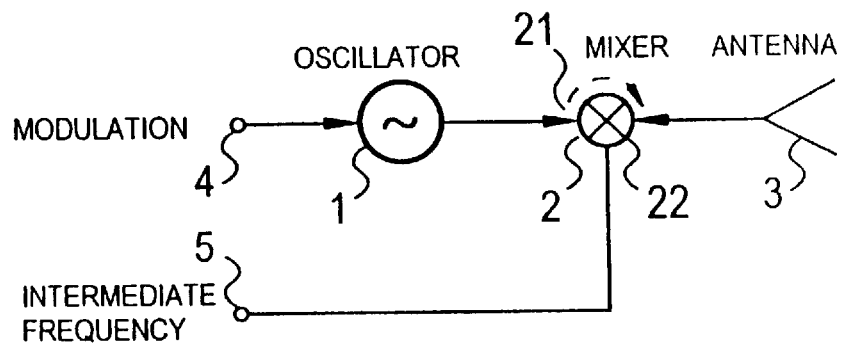
FIG. 1 is a schematic illustration of the inventive arrangement.
Figure 3:
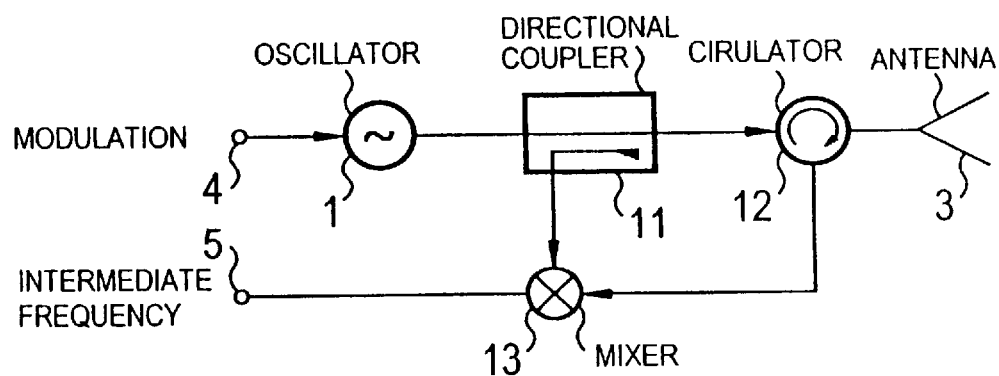
FIGS. 3 and 4 depict prior art radar systems.
Figure 4:
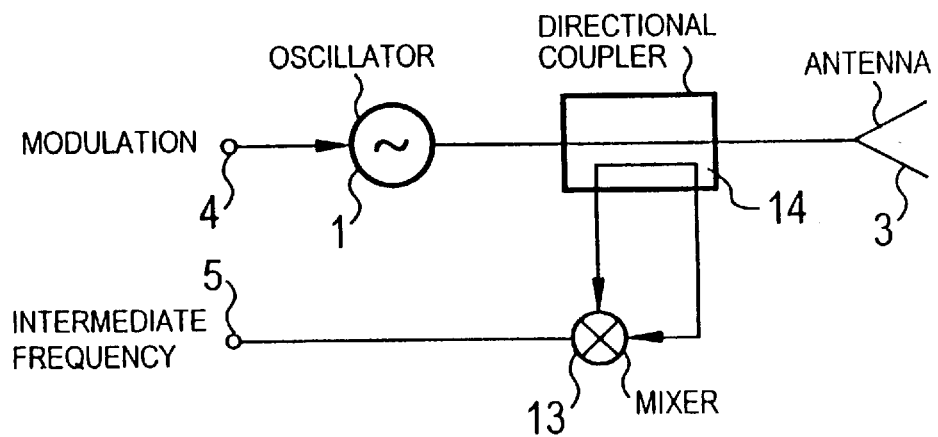

FIG. 1 illustrates the arrangement of an oscillator 1, a mixer 2 and an antenna 3. An external modulation of the radio-frequency signal produced by the oscillator ensues via the terminal 4. The intermediate frequency supplied by the mixer is provided at the terminal 5 of the output port of the mixer. The curved broken arrow indicates the partial coupling of the power supplied by the oscillator to the antenna terminal. The local oscillator input 21 (LO input) of the mixer 2 is connected directly with the oscillator 1, and the RF input 22 of the mixer is connected directly with the antenna 3. In a balanced mixer of standard design, as used e.g. in the above-specified arrangements of FIGS. 3 and 4, the best possible decoupling of all three ports (two input ports, one output port) is striven for. In the arrangement of FIG. 1, this would have the consequence that no radiation takes place via the antenna, since all the power flowing from the oscillator to the input port of the mixer would be absorbed in the mixer. The inventively used balanced mixer is thus modified so that a defined part of the power of the radio-frequency signal supplied by the oscillator couples to the other input port of the mixer, and flows along this path to the antenna 3.

Figure 2:
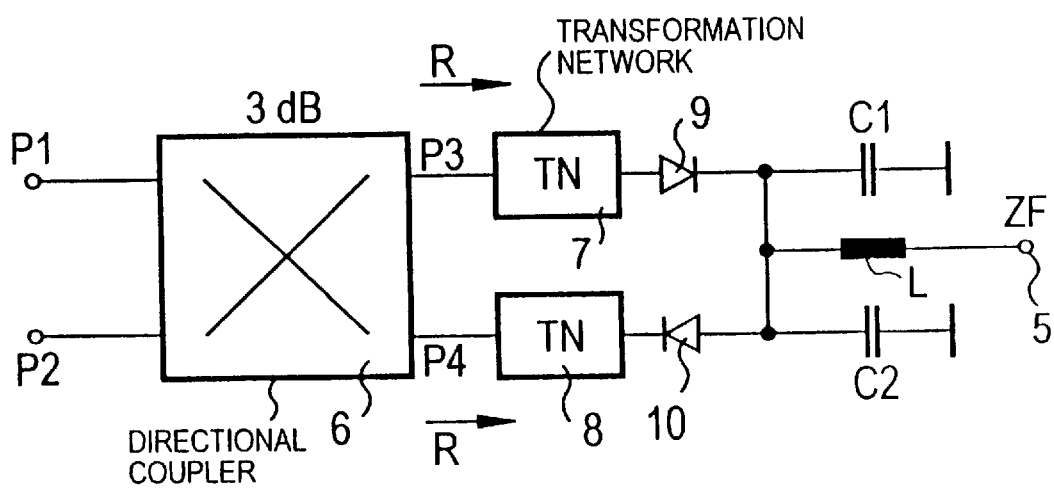
FIG. 2 schematically illustrates the construction of the mixer used in the arrangement of FIG. 1.

FIG. 2 illustrates the schematic diagram of the design of a balanced mixer with Schottky diodes. This mixer comprises a directional coupler 6, transformation networks 7, 8 (TN), diodes 9, 10 and a CLC element (capacitors C1, C2 and inductor L) with a terminal 5, the output port of the mixer. The diodes 9, 10 are arranged in opposite directions to one another, whereby the desired balancing effect results at the output port 5. Linear combinations of the signals present at the inputs P1, P2 of the directional coupler 6 flow to the outputs P3, P4 of the directional coupler. Due to the non-linear characteristics, the diodes produce signals that are, among others, at the difference frequency, which signals flow to the terminal 5 as intermediate frequency signal, via the lowpass filter formed by the CLC element. The transformation networks 7, 8 convert the impedances of the diodes 9, 10 in such a way that the same load impedances with a positive reflection factor result at the outputs P3, P4 of the directional coupler. These transformation networks can be omitted if the diode impedance already leads immediately to the desired reflection factor, or this reflection factor can be brought about by other factors, such as e.g. the application of a suitable direct voltage to the diodes. In place of the diodes, other suitable semiconductor components can be used in a balanced arrangement, e.g. transistors that have non-linear characteristics. The reflection factor is preferably set significantly larger than zero and preferred values result in the region larger than 0.3. In spite of the non-disappearing reflection factor, the input ports of the mixer remain ideally matched, due to the selected phase difference of 90° between the coupling arms. However, the decoupling is canceled, and the power attenuation between the input ports is $1/|R|^2$. If for example $|R|=2^{-\frac{1}{2}}$, half the power fed to the input ports is transmitted to the respective other input port.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A monostatic homodyne radar system, comprising:
   an oscillator for producing a radio-frequency signal;
   a balanced mixer having first and second input ports and one output port;
   an antenna;
   the first input port of the mixer connected to the oscillator and the second input port of the mixer connected to the antenna;
   the mixer having a directional coupler with a 90° phase difference between coupling arms thereof;
   the directional coupler having first and second inputs that form the first and second ports, respectively, of the mixer, and having first and second outputs;
   the first and second outputs of the directional coupler being terminated with impedances such that a reflection factor results that is at least large enough that coupling of power emitted by the oscillator occurs between the first and second input ports of the mixer, which coupling provides for a provided transmission power.

2. The radar system according to claim 1, wherein the reflection factor is at least 0.3.

3. The radar system according to claim 1, wherein the mixer has first and second transformation networks, each of the transformation networks having an input and an output, wherein an input of each of the transformation networks is respectively connected to the first and second output, respectively, of the directional coupler, and wherein an output of each of the transformation networks is respectively connected to a non-linear circuit element, and wherein the transformation networks effect the reflection factor at the first and second outputs of the directional coupler.

4. The radar system according to claim 1, wherein the mixer has non-linear circuit elements that are directly connected to the first and second outputs of the directional coupler, and that are structured so that the reflection factor is produced.

5. The radar system according to claim 1, wherein the radar system further comprises a modulated radio-frequency signal.

6. A monostatic homodyne radar system, comprising:
   an oscillator for producing a radio-frequency signal;
   a balanced mixer having first and second input ports and one output port;
   an antenna;
   the first input port of the mixer connected to the oscillator and the second input port of the mixer connected to the antenna;
   the mixer having a directional coupler with a 90° phase difference between coupling arms thereof;
   the directional coupler having first and second inputs that form the first and second ports, respectively, of the mixer, and having first and second outputs;
   the first and second outputs of the directional coupler being terminated with first and second impedances, respectively, such that a reflection factor results that effects coupling of power emitted by the oscillator between the first and second input ports of the mixer, which coupling provides a predetermined transmission power;

the mixer having first and second transformation networks, each of the transformation networks having an input and an output, a respective input of each of the transformation networks is respectively connected to the first output and second output, respectively, of the directional coupler, and a respective output of each of the transformation networks respectively connected to first and second non-linear circuit elements, respectively, and wherein the transformation networks effect the reflection factor at the first and second outputs of the directional coupler.

7. The radar system according to claim 6, wherein the reflection factor is at least 0.3.

8. The radar system according to claim 6, wherein the non-linear circuit elements are directly connected to the first and second outputs of the directional coupler, and are structured such that the reflection factor is produced.

9. The radar system according to claim 6, wherein the radar system further comprises a modulated radio-frequency signal.

10. A monostatic homodyne radar system, comprising:

an oscillator for producing a radio-frequency signal;

a balanced mixer having first and second input gates and one output port;

an antenna;

the first input port of the mixer connected to the oscillator and the second input port of the mixer connected to the antenna;

the mixer having a directional coupler with a 90° phase difference between coupling arms thereof;

the directional coupler having first and second inputs that form the first and second ports, respectively, of the mixer, and having first and second outputs;

the first and second outputs of the directional coupler being terminated with first and second impedances, respectively, such that a reflection factor results that effects coupling of power emitted by the oscillator between the first and second input ports of the mixer, which coupling provides for a predetermined transmission power;

the mixer having first and second transformation networks, each of the transformation networks having an input and an output, a respective input of each of the transformation networks respectively connected to the first output and second output, respectively, of the directional coupler, and a respective output of each of the transformation networks respectively connected to first and second non-linear circuit elements, respectively, whereby the transformation networks effect the reflection factor at the first and second outputs of the directional coupler;

the first and second non-linear circuit elements directly connected to the first and second outputs, respectively, of the directional coupler, and structured such that the reflection factor is produced.

11. The radar system according to claim 10, wherein the reflection factor is at least 0.3.

12. The radar system according to claim 10, wherein the radar system further comprises a modulated radio-frequency signal.

* * * * *